(12) United States Patent
DiCarlo et al.

(10) Patent No.: US 9,302,173 B2
(45) Date of Patent: Apr. 5, 2016

(54) MOTORIZED, WHEELED PERSONAL VEHICLE AND RELATED METHODS

(71) Applicants: Joseph A. DiCarlo, Chester, NH (US); Joseph Ryan DiCarlo, Chester, NH (US)

(72) Inventors: Joseph A. DiCarlo, Chester, NH (US); Joseph Ryan DiCarlo, Chester, NH (US)

( * ) Notice: Subject to any disclaimer, the term of this patent is extended or adjusted under 35 U.S.C. 154(b) by 30 days.

(21) Appl. No.: 14/690,868

(22) Filed: Apr. 20, 2015

(65) Prior Publication Data

US 2015/0297975 A1 Oct. 22, 2015

Related U.S. Application Data

(60) Provisional application No. 61/981,381, filed on Apr. 18, 2014.

(51) Int. Cl.
| | | |
|---|---|---|
| *A63C 17/01* | (2006.01) | |
| *A63C 17/12* | (2006.01) | |
| *B62M 6/45* | (2010.01) | |

(52) U.S. Cl.
CPC .............. *A63C 17/12* (2013.01); *A63C 17/012* (2013.01); *B62M 6/45* (2013.01)

(58) Field of Classification Search
CPC ..... A63C 17/12; A63C 17/01; A63C 2203/12
See application file for complete search history.

(56) References Cited

U.S. PATENT DOCUMENTS

| | | | |
|---|---|---|---|
| 5,487,441 A | | 1/1996 | Endo et al. |
| 5,839,737 A | | 11/1998 | Kruczek |
| 5,893,425 A | | 4/1999 | Finkle |
| 6,050,357 A | * | 4/2000 | Staelin ................. A63C 17/004 180/181 |
| 6,345,678 B1 | * | 2/2002 | Chang ..................... B62K 3/002 180/181 |
| 6,726,523 B2 | | 4/2004 | Baker et al. |
| 6,848,527 B2 | | 2/2005 | Nelson |
| 6,901,872 B1 | | 6/2005 | Battle et al. |
| 7,053,288 B2 | | 5/2006 | Iwai et al. |
| 8,061,725 B1 | | 11/2011 | Hawkins |
| 2002/0096380 A1 | * | 7/2002 | Lai ......................... B62K 3/002 180/181 |
| 2004/0065494 A1 | | 4/2004 | Nelson |
| 2004/0206562 A1 | | 10/2004 | Lin |
| 2005/0006158 A1 | | 1/2005 | Tsai |
| 2007/0272465 A1 | | 11/2007 | Su |
| 2010/0222941 A1 | | 9/2010 | Chang |
| 2012/0232734 A1 | | 9/2012 | Pelletier |
| 2013/0175790 A1 | | 7/2013 | Wurst |
| 2013/0206493 A1 | | 8/2013 | Larson et al. |

* cited by examiner

Primary Examiner — Bryan Evans
(74) Attorney, Agent, or Firm — Hayes Soloway PC (57) ABSTRACT

A motorized, wheeled personal vehicle and related methods thereof is provided. The motorized, wheeled personal vehicle includes a deck and at least one truck affixed to the deck. A bushing assembly is interfaced between the at least one truck and the deck. An axle and wheel assembly is rotatably connected to the at least one truck. A motor is affixed to the truck, wherein the motor has a gear extending into a cavity within the truck, wherein the gear is operatively connected to the axle and wheel assembly.

16 Claims, 8 Drawing Sheets

MOTORIZED, WHEELED PERSONAL VEHICLE AND RELATED METHODS

CROSS REFERENCE TO RELATED APPLICATION

This application claims benefit of U.S. Provisional Application Ser. No. 61/981,381 entitled, "Motorized, Wheeled Personal Vehicle and Related Methods" filed Apr. 18, 2014, the entire disclosure of which is incorporated herein by reference.

FIELD OF THE DISCLOSURE

The present disclosure is generally related to personalized wheeled vehicles and more particularly is related to a motorized, wheeled personal vehicle and related methods.

BACKGROUND OF THE DISCLOSURE

Personalized wheeled vehicles are commonly used for transportation and recreation purposes. The personalized wheeled vehicle usually carries one or two riders for relatively short distances, operating under user-power for movement at slower speeds. For example, skateboards and longboards, usually a single rider who powers the board by pushing off of the ground surface with one of their feet, while standing on the platform of the board with the other foot. Some personalized wheeled vehicles may include motors to assist with movement of the board or replacement of the user-powered movement. These motorized boards use electric or fossil fuel powered motors which are connected to an axle of the board with a belt or band. While these motorized boards offer benefits over traditional skateboards and longboards, they have drawbacks too, including the inefficient transfer of power from the motor and the high likelihood of malfunction due to the exposed belt.

Thus, a heretofore unaddressed need exists in the industry to address the aforementioned deficiencies and inadequacies.

SUMMARY OF THE DISCLOSURE

Embodiments of the present disclosure provide a motorized, wheeled personal vehicle. Briefly described, in architecture, one embodiment of the vehicle, among others, can be implemented as follows. The motorized, wheeled personal vehicle has a deck. At least one truck is affixed to the deck. A bushing assembly is interfaced between the at least one truck and the deck. An axle and wheel assembly is rotatably connected to the at least one truck. A motor is affixed to the truck. The motor has a gear extending into a cavity within the truck, wherein the gear is operatively connected to the axle and wheel assembly.

The present disclosure can also be viewed as providing a motorized, single-rider skateboard vehicle. Briefly described, in architecture, one embodiment of the vehicle, among others, can be implemented as follows. The motorized, single-rider skateboard vehicle has a skateboard deck. Two trucks are affixed to the skateboard deck. A bushing assembly is interfaced between each of the two trucks and the skateboard deck. An axle and wheel assembly is rotatably connected to at least one of the two trucks. A motor is operatively connected to the axle and wheel assembly with at least one non-belt driven connection having at least one gear extending into a cavity within the truck, wherein the motor is free from a connection with the deck.

The present disclosure can also be viewed as providing methods of riding a motorized, single-rider skateboard vehicle. In this regard, one embodiment of such a method, among others, can be broadly summarized by the following steps: providing a motorized, single-rider skateboard vehicle having a skateboard deck, two trucks affixed to the skateboard deck, a bushing assembly interfaced between each of the two trucks and the skateboard deck, and an axle and wheel assembly rotatably connected to at least one of the two trucks, wherein the deck is adapted to carry a rider of the motorized, single-rider skateboard vehicle; supplying a quantity of electrical power to a motor operatively connected to the axle and wheel assembly with at least one non-belt driven connection having at least one gear extending into a cavity within the truck, wherein the motor is free from a connection with the deck; and user-controlling the motor with a remote control device adapted to be carried by the rider of the motorized, single-rider skateboard vehicle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
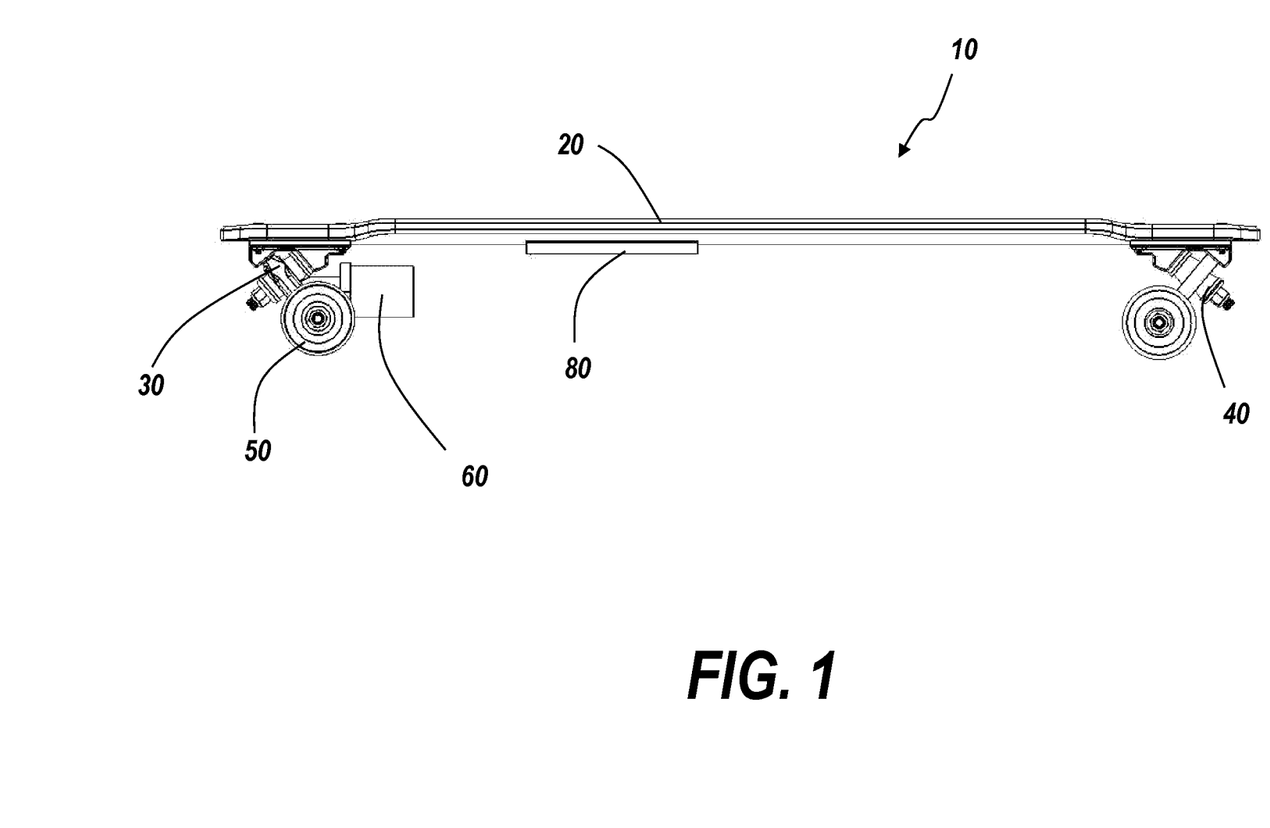
FIG. 1 is a side view illustration of a motorized, wheeled personal vehicle, in accordance with a first exemplary embodiment of the present disclosure.

FIG. 1 is a side view illustration of a motorized, wheeled personal vehicle 10, in accordance with a first exemplary embodiment of the present disclosure. The motorized, wheeled personal vehicle 10, which may be referred to herein simply as 'vehicle 10' includes a deck 20 and at least one truck 30 affixed to the deck 20. A bushing assembly 40 is interfaced between the at least one truck 30 and the deck 20. An axle and wheel assembly 50 is rotatably connected to the at least one truck 30. A motor 60 is affixed to the truck 30. As shown in detail in FIGS. 5-6, the motor has a gear 70 extending into a cavity 32 within the truck 30, wherein the gear 70 is operatively connected to the axle and wheel assembly 50.

The vehicle 10 may include many types of motorized, wheeled personal vehicles, most notably skateboards, longboard, or other vehicles that are primarily designed to carry one or two users in a standing position. The vehicle 10 may include other features that are commonly associated with motorized, wheeled personal vehicles, such as specific positioning or features for a user's feet and handle bars and/or a riser to position the handle bars at an appropriate position.

The vehicle 10 may be used with a motor-driven power system which uses a motor 60 operatively connected to an axle and wheel assembly 50 to move the vehicle 10. A battery system 80 may be electrically connected to the motor 60. In one example, the battery system 80 is positioned on an underside 24 of the deck and is electrically connected to the motor 60 using non-obstructive wiring, e.g., wiring which will not interfere with operation of the vehicle 10. The battery system 80 may include a regenerative battery charging system. As can be seen in FIG. 1, the motor 60 may be positioned under the deck 20 of the vehicle 10 such that it is not likely to inconvenience or disrupt use of the vehicle 10. Further, the motor 60 may be affixed only to the truck 30, e.g., free from connection with the deck 20, thereby allowing the only connection to the deck 20 to be formed by the truck 30 and the bushing assembly 40.

Figure 2A:
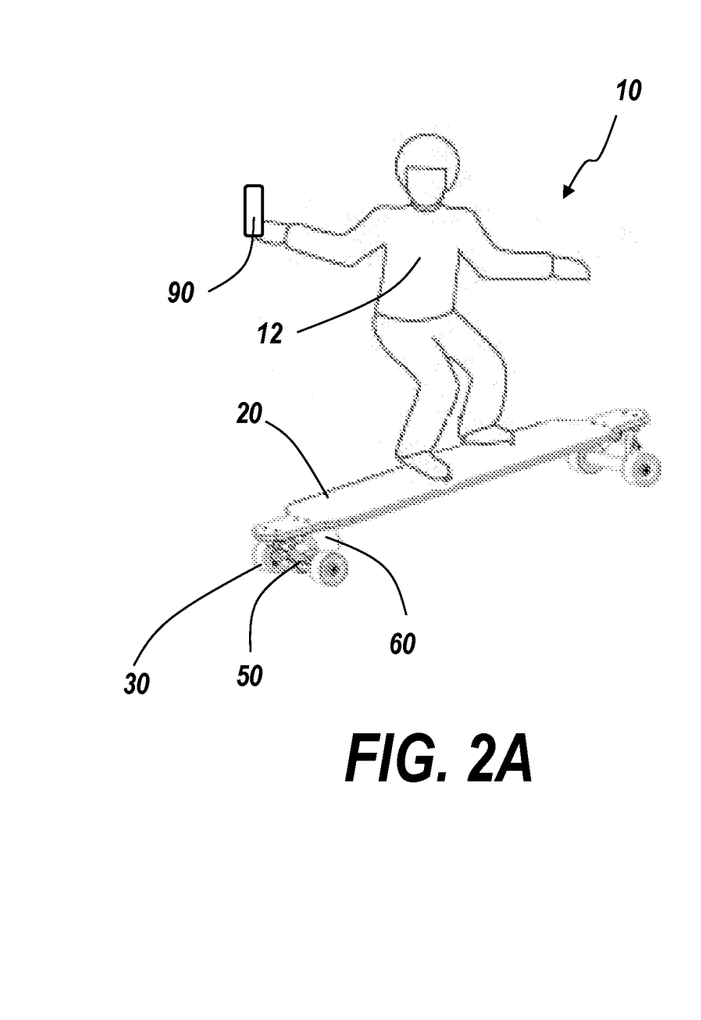
FIG. 2A is an isometric schematic view illustration of a motorized, wheeled personal vehicle with a rider thereon, in accordance with the first exemplary embodiment of the present disclosure.

FIG. 2A is an isometric schematic view illustration of a motorized, wheeled personal vehicle 10 with a rider 12 thereon, in accordance with the first exemplary embodiment of the present disclosure. As is shown, the vehicle 10 may be a skateboard or similar single-rider device which a rider 12 can use by standing on the deck 20 in an athletic position. To control the vehicle 10, the rider 12 may utilize a controller 90 in communication with the motor 60, where the controller 90 controls an operation of the motor 60. The communication between the controller 90 and the motor 60 may be accomplished by any known communication mediums, including wired and wireless. In one example, as is depicted in FIG. 2A, the controller 90 may include a remote control device adapted to be carried by the rider 12 while he or she is on the vehicle 10. In this situation, the rider 12 may use the remote controller 90 to control the motor 60, such as the speed of the motor 60 which effectively controls the speed of the vehicle 10.

Figure 2B:
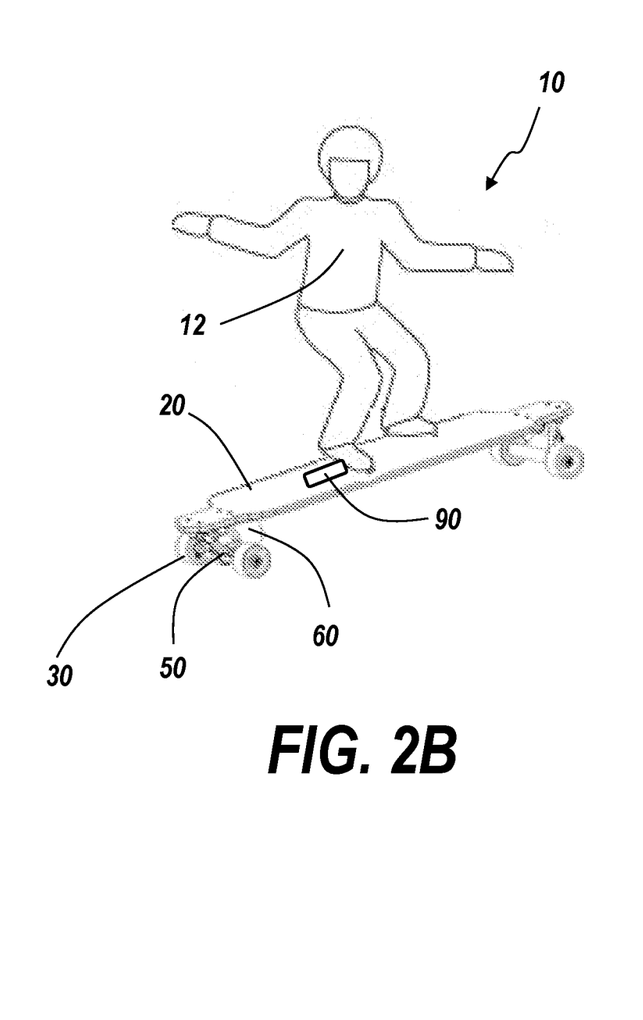
FIG. 2B is an isometric schematic view illustration of a motorized, wheeled personal vehicle with a rider thereon, in accordance with the first exemplary embodiment of the present disclosure.

FIG. 2B is an isometric schematic view illustration of a motorized, wheeled personal vehicle 10 with a rider 12 thereon, in accordance with the first exemplary embodiment of the present disclosure. As is shown in FIG. 2B, the rider 12 may utilize a controller 90 in communication with the motor 60 which can be operated by the rider's 12 foot. For example, the controller 90 may include a variable pressure switch on the deck 20 which is located near the rider's 12 foot placement. When the vehicle 10 is used, the rider 12 may actuate the variable pressure switch with their toe. The more pressure the rider 12 places on the variable pressure switch, the faster the vehicle 10 may be moved. To decrease a speed of the vehicle 10, the rider 12 may lessen the pressure on the variable pressure switch. It is noted that the variable pressure switch may be used alone or in combination with a hand-operated control, such as shown in FIG. 2A.

Figure 3:
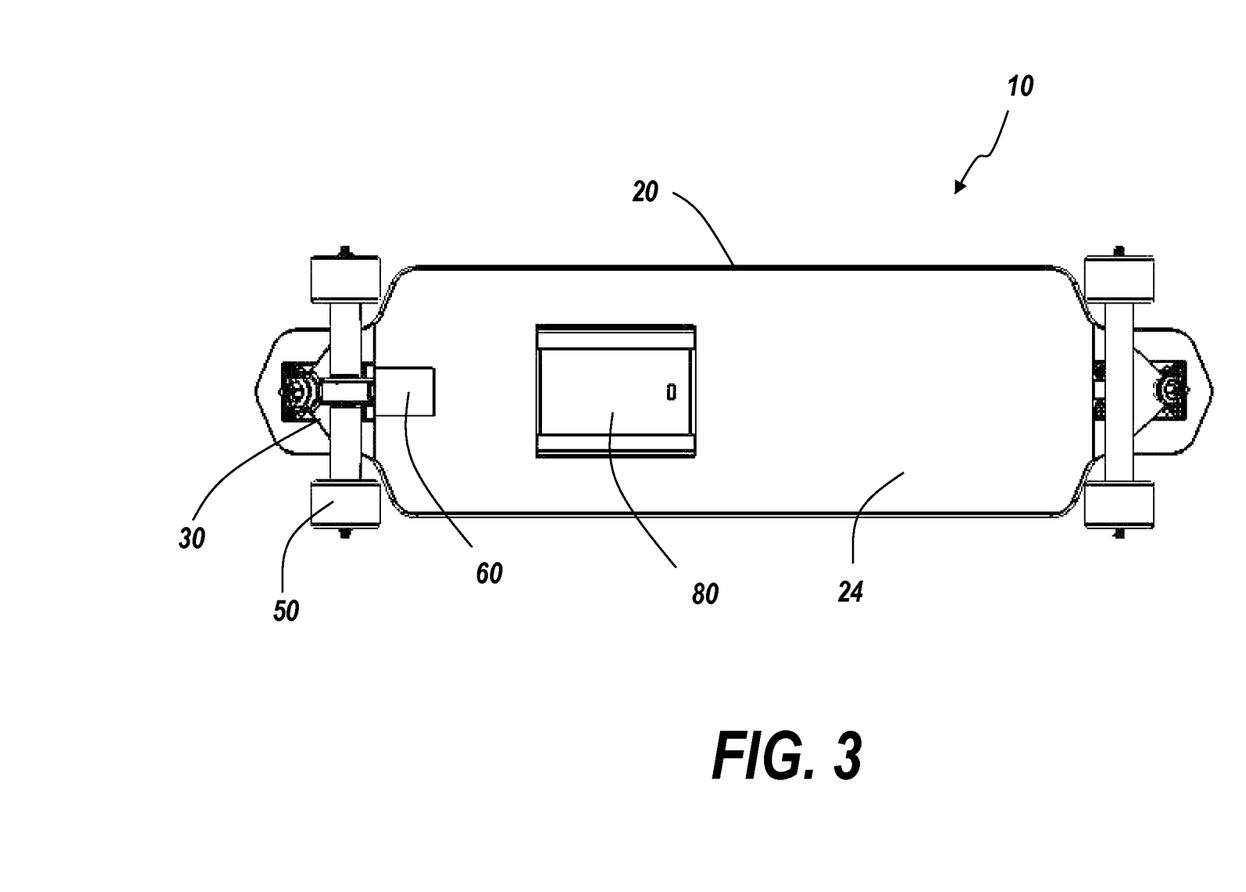
FIG. 3 is a bottom view illustration of the vehicle of FIG. 1, in accordance with the first exemplary embodiment of the present disclosure.

FIG. 3 is a bottom view illustration of the vehicle 10 of FIG. 1, in accordance with the first exemplary embodiment of the present disclosure. As can be seen in FIG. 3, the motor 60 may be positioned proximate to one truck 30 such that it can transfer rotational movement of the motor shaft to the axle and wheel assembly 50. Optionally, a motor 60 may be used with each truck 30 of the vehicle 10. It may be preferable for the motor 60 to be positioned towards an interior of the vehicle 10, e.g., between two trucks 30 to lessen the risk of damage to the motor 60 during operation of the vehicle 10. The battery system 80 may be positioned on the underside 24 of the deck 20 with an electrical connection between the battery system 80 and the motor 60 positioned along any convenient path therebetween.

Figure 4:
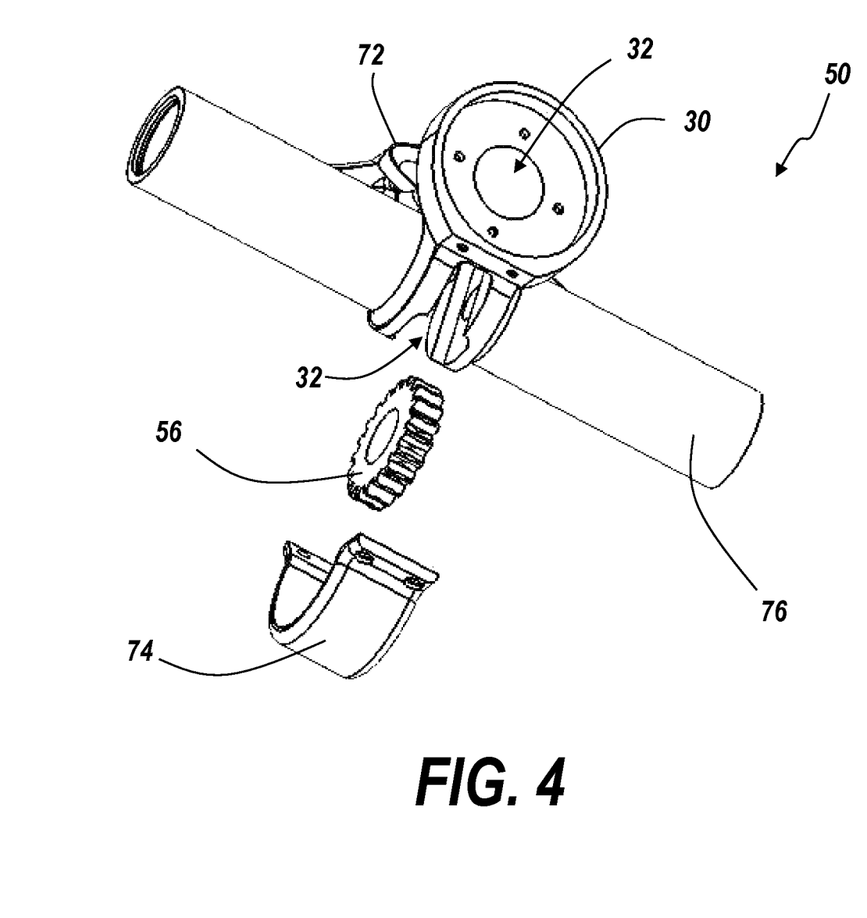
FIG. 4 is an exploded view illustration of the axle and wheel assembly of the vehicle of FIG. 1, in accordance with the first exemplary embodiment of the present disclosure.

FIG. 4 is an exploded view illustration of the axle and wheel assembly 50 of the vehicle 10 of FIG. 1, in accordance with the first exemplary embodiment of the present disclosure. As is shown, the cavity 32 may be positioned within the truck 30 which is formed integral with parts of the axle and wheel assembly 50. The cavity 32 may include a fluid tight cavity which contains a lubricating fluid therein. The lubricating fluid, such as gear oil, may thoroughly coat the components of the axle and wheel assembly 50, the gear 70 (FIGS. 5-6), and other components of the vehicle 10. The axle and wheel assembly 50 may include an upper housing cover 72 positioned between the truck 30 and the motor 60 in a position above the cavity 32 where the gear 70 would be located. A lower housing cover 74 may be positioned between the truck 30 and the motor 60 in a position below the cavity 32 where the gear 70 is located. An axle housing cover 76 may be formed around the axle and integral with the truck 30. The lower housing cover 74 may be removably connectable to the axle housing cover 76, such as with a plurality of threaded connectors and threaded receiving holes.

Figure 5:
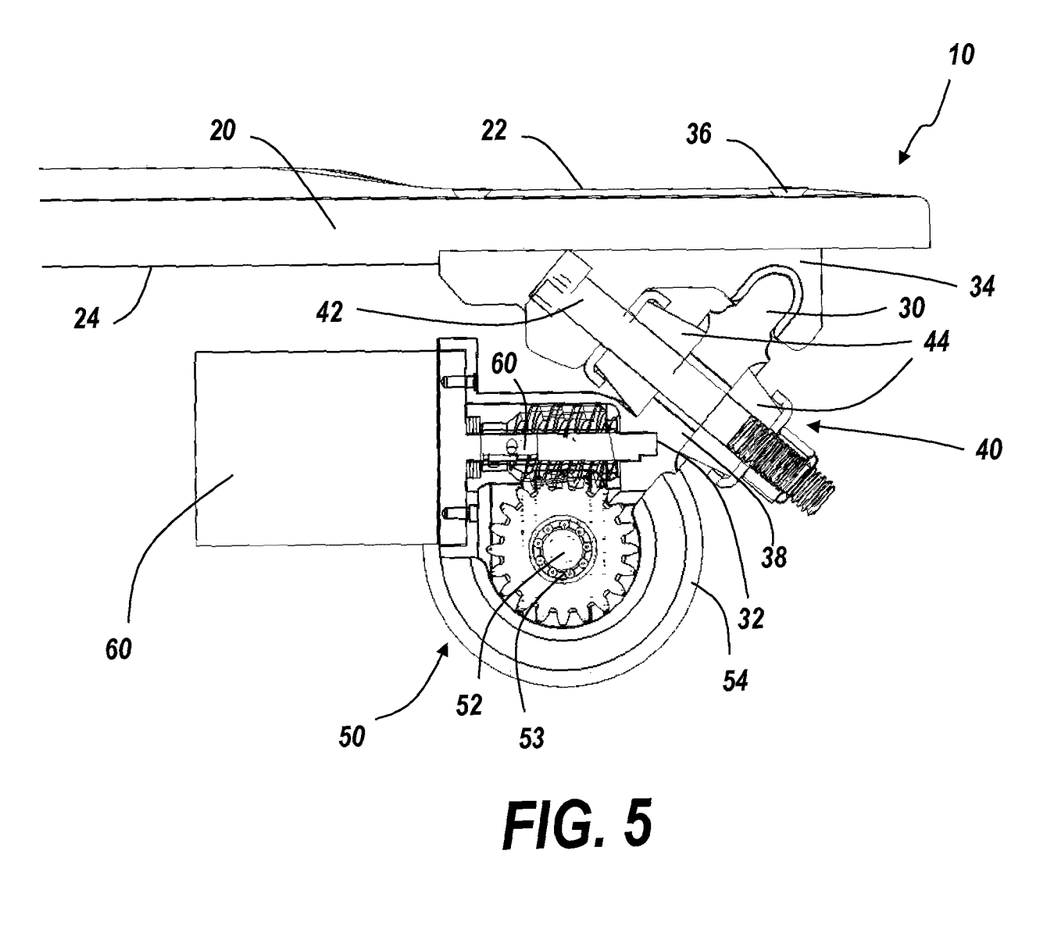
FIG. 5 is a cross-sectional side view illustration of the vehicle of FIG. 1, in accordance with the first exemplary embodiment of the present disclosure.

FIG. 5 is a side view illustration of the vehicle 10 of FIG. 1, in accordance with the first exemplary embodiment of the present disclosure. In detail, the vehicle 10 includes a deck 20 and at least one truck 30 affixed to the deck 20. A bushing assembly 40 is interfaced between the at least one truck 30 and the deck 20. An axle and wheel assembly 50 is rotatably connected to the at least one truck 30. A motor 60 is affixed to the truck 30, wherein the motor 60 has a gear 70 extending into a cavity 32 within the truck 30, wherein the gear 70 is operatively connected to at least a portion of the axle and wheel assembly 50.

Relative to FIG. 5, the deck 20 may be a substantially planar structure having a durability that is sufficient to support one or more users. The deck 20 may include a textured upper surface 22 for facilitating ease of use of the vehicle 10. The truck 30 is connected to the deck 20, normally on an underside 24 of the deck 20. Commonly two trucks 30 may be used to each support a single axle 52 having two wheels 54. The truck 30 may include an upper portion 34 which is fixedly attached to the underside 24 of the deck 20 with any number of fasteners 36. The upper portion 34 may have a cavity that receives a main truck support 38, which ultimately connects the axle and wheel assembly 50 to the upper portion 34 of the truck 30.

The bushing assembly 40 may include an elongated bolt 42 that is connected between the upper portion 34 of the truck 30 and the main truck support 38. For example, the elongated bolt 42 may be positioned through a hole within the main truck support 38, whereby two rubberized bushings 44 are positioned on either side of the hole. Threaded fasteners and/or clips may retain the rubberized bushings 44 proximate to the main truck support 38. In use, the main truck support 38 may pivot about the cavity within the upper portion 34 and the rubberized bushings 44 may cushion the movement of the main truck support 38.

Figure 6:
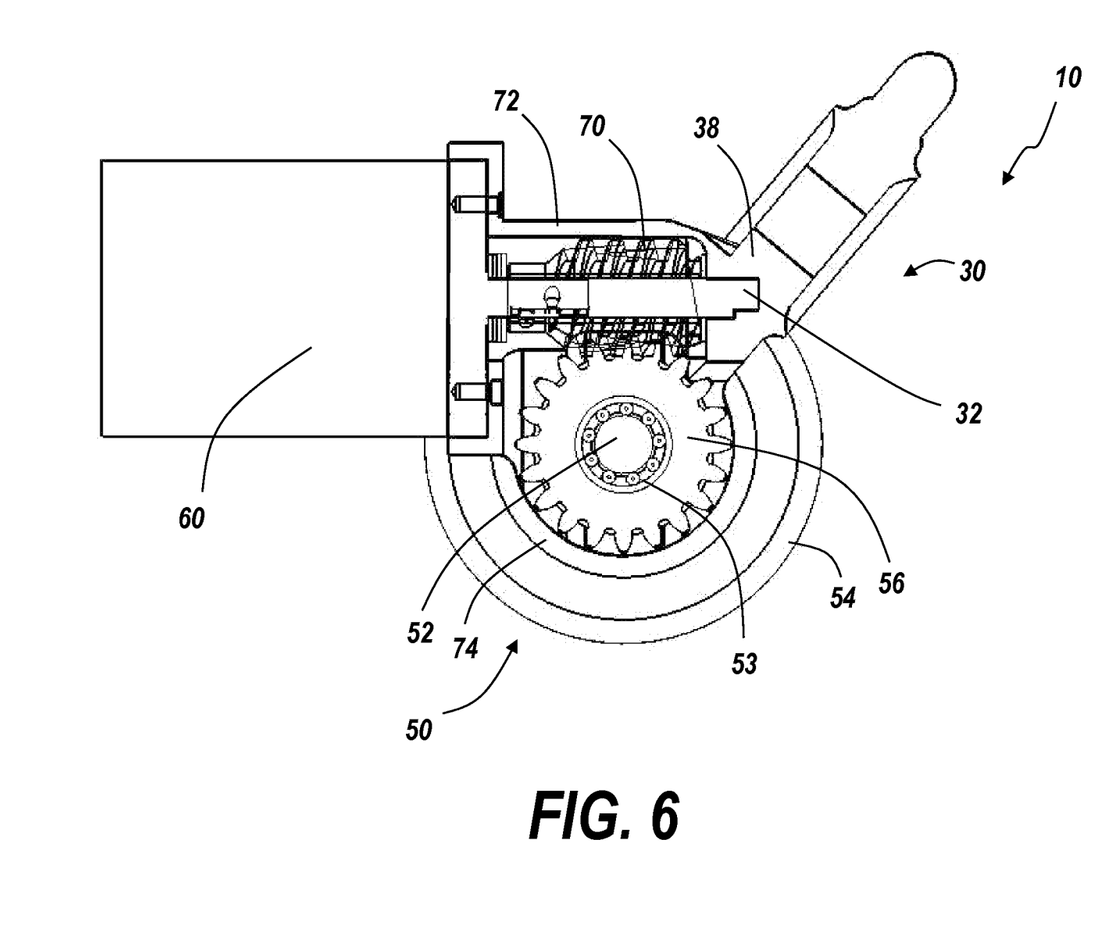
FIG. 6 is a cross-sectional side view illustration of the truck, the axle and wheel assembly, the motor, and the gear of vehicle of FIG. 1, in accordance with the first exemplary embodiment of the present disclosure.

FIG. 6 is a side view illustration of the truck 30, the axle and wheel assembly 50, the motor 60, and the gear 70 of vehicle 10 of FIG. 1, in accordance with the first exemplary embodiment of the present disclosure. The motor 60 may be fixedly attached to the main truck support 38 in a position proximate to the hole within the main truck support 38. The gear 70 may extend from an outlet of the motor 60 towards the main truck support 38, such that at least an end of the gear 70 is positioned within a cavity 32 of the main truck support 38. The cavity 32, which may be characterized as an interior area of the main truck support 38, may retain the gear 70 in a proper position relative to the axle and wheel assembly 50. The gear 70 may include a worm gear, a helical gear, or other non-belted gear structure that transfers rotational movement of the motor shaft to the axle 52. A secondary gear 56 may be affixed to the axle 52 to operatively interface with the gear 70 to receive the rotational movement of the motor shaft and transfer it to the axle 52 for rotation of the wheels 54.

As can be seen in FIG. 6, the motor 60 may be directly affixed to the truck 30 at the main truck support 38. An upper cover 72 may be used to both connect the motor 60 to the main truck support 38 and to cover the gear 70. Thus, the entire assembly of the gear 70 and the motor outlet may be protected with the upper cover 72. A lower cover 74 may be used to protect the secondary gear 56. The upper and lower covers 72, 74 may be formed separately or integrally with the main truck support 38. The interior of the main truck support 38 may be partially hollow to receive the end of the gear shaft of the gear 70, such as within the cavity 32. The interior space between the upper and lower covers 72, 74 may be fully enclosed, and may be fully or partially filled with a lubricant, such as oil or a grease bath to aid in proper engagement between the gear 70 and the secondary gear 56, among other components.

Relative to FIGS. 1-6, in use, the vehicle 10 may be controlled with a remote device, such as a remote control, or another system which allows the user to control the operation of the motor 60. A clutch or clutch assembly using a clutch bearing 53 may be used to optimize rotation of the motor 60 relative to a desired speed of the vehicle 10. The clutch bearing 53 may also be located on the motor shaft between the gear 70 and the motor shaft, or between the axle and wheels of the axle and wheel assembly 50. The clutch bearing 53 does not induce any drag on the axle and wheel assembly 50, unlike conventional systems known in the art, such as a ratchet and pawl system. In some cases, a freewheeling clutch may be employed, thereby allowing a rider to disengage the motor 60 and use the vehicle 10 without the use of motorized power. For example, in this situation, the rider may use the vehicle 10 as a conventional skate board with the axle and wheel assembly 50 not powered by the motor 60. Further, disengagement of the motor 60 from the axle and wheel assembly 50 with a clutch may allow the axle and wheel assembly 50 to be free from drag due to mechanical engagement with the motor 60. Conventional vehicles may use belt-driven systems or fully engaged systems that cannot be disengaged for temporary, non-motorized use of the vehicle. The vehicle 10 may allow for recharging of the battery system 80 through a regenerative battery charging system, such that the power generated during a downhill use of the vehicle 10 may be converted into electrical power and stored within the battery system 80. Other devices, systems, or components thereof that are known in the art may be used with the vehicle 10, all of which are considered within the scope of the present disclosure.

Figure 7:
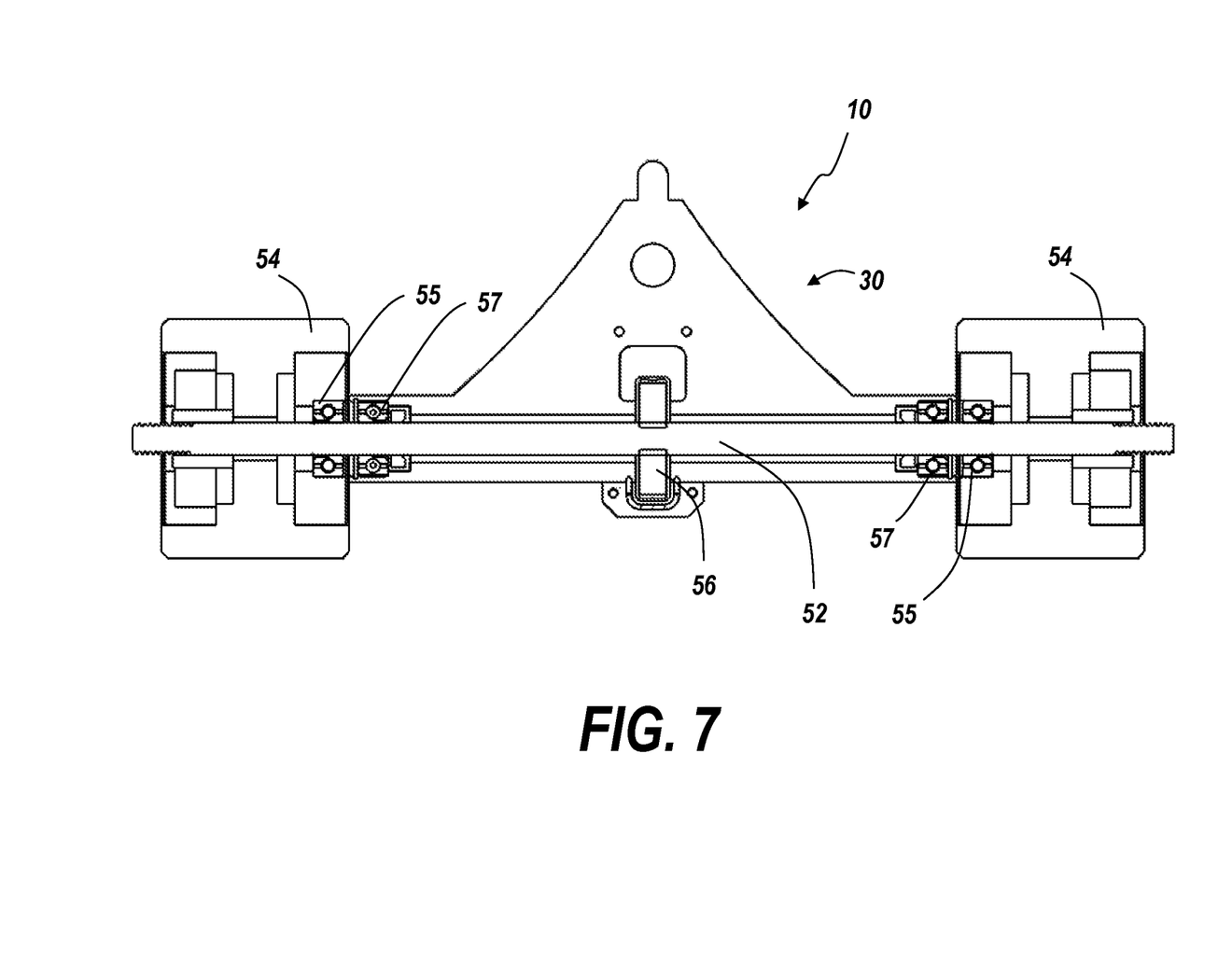
FIG. 7 is a cross-sectional side view illustration of the truck, the axle and wheel assembly, and the motor of vehicle of FIG. 1, in accordance with the first exemplary embodiment of the present disclosure.

FIG. 7 is a cross-sectional side view illustration of the truck 30, the axle and wheel assembly 50, and the motor 60 of vehicle of FIG. 1, in accordance with the first exemplary embodiment of the present disclosure. Specifically, FIG. 7 illustrates one alternative to the clutch bearing shown in FIGS. 5-6. As can be seen, FIG. 7 utilizes a secondary gear 56 positioned about an axle 52 and operatively connected to motor gear (not shown), where a bearing 55 is positioned between the axle 52 and a wheel 54. The bearing 55 may be a one-way locking bearing which is positioned fully or partially within the wheel 54. This type of bearing may be known as a Sprag bearing. Other bearings, such as ball bearings 57 may be included for the axle 52. This configuration of the vehicle 10 may function in similar ways to the clutch bearing discussed relative to FIGS. 5-6 herein.

Relative to the motor 60, it is noted that the single motor 60 may be capable of driving two wheels 54, e.g., both wheels 54 on one truck 30, so there is a positive drive system. This positive drive system in combination with the bearings 55 positioned within each of the wheels 54 may act as a differential for the drive system preventing the wheel from slipping on a lower-friction riding surface. Thus, the operative connections discussed herein may provide successful use of the vehicle 10 in various riding surfaces to prevent slipping of the wheels 54, such as, for example, in situations where sand or other debris is present on asphalt and is likely to cause one wheel 54 to slip.

Figure 8:
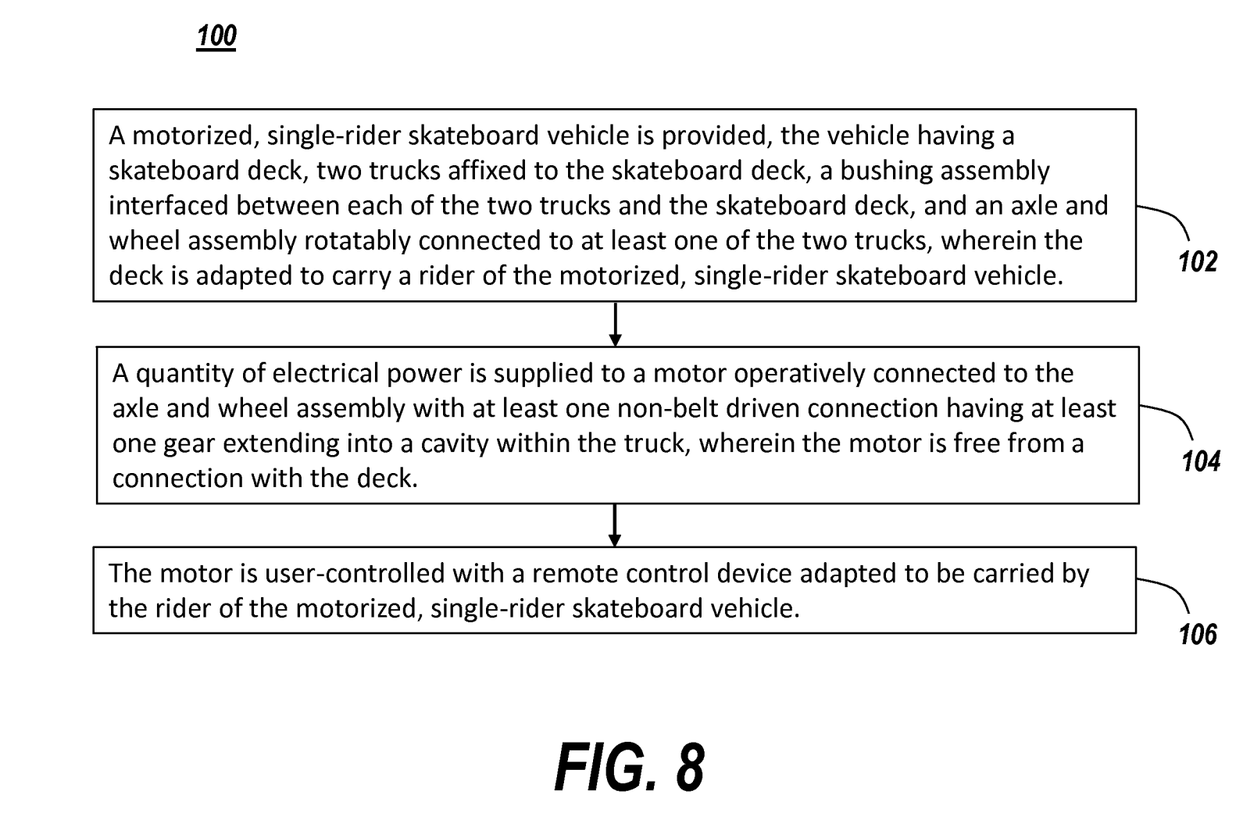
FIG. 8 is a flowchart illustrating a method of riding a motorized, single-rider skateboard vehicle, in accordance with the first exemplary embodiment of the disclosure.

FIG. 8 is a flowchart 100 illustrating a method of riding a motorized, single-rider skateboard vehicle, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a motorized, single-rider skateboard vehicle is provided, the vehicle having a skateboard deck, two trucks affixed to the skateboard deck, a bushing assembly interfaced between each of the two trucks and the skateboard deck, and an axle and wheel assembly rotatably connected to at least one of the two trucks, wherein the deck is adapted to carry a rider of the motorized, single-rider skateboard vehicle. A quantity of electrical power is supplied to a motor operatively connected to the axle and wheel assembly with at least one non-belt driven connection having at least one gear extending into a cavity within the truck, wherein the motor is free from a connection with the deck (block 104). The motor is user-controlled with a remote control device adapted to be carried by the rider of the motorized, single-rider skateboard vehicle (block 106).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A motorized, wheeled personal vehicle comprising:
   a deck;
   at least one truck affixed to the deck;
   a bushing assembly interfaced between the at least one truck and the deck;
   an axle and wheel assembly rotatably connected to the at least one truck; and
   a motor affixed to the truck, the motor having a gear extending into a cavity within the truck, wherein the gear is operatively connected to the axle and wheel assembly, wherein the cavity within the truck further comprises a fluid tight cavity, wherein a lubricating fluid is contained within the fluid tight cavity.

2. The motorized, wheeled personal vehicle of claim 1, wherein the motor is affixed only to the truck.

3. The motorized, wheeled personal vehicle of claim 1, wherein the gear is operatively connected to the axle and wheel assembly without a belt.

4. The motorized, wheeled personal vehicle of claim 1, wherein the gear extends into a main truck support of the at least one truck, wherein the main truck support is positioned between the axle and wheel assembly and the bushing assembly.

5. The motorized, wheeled personal vehicle of claim 1, wherein the axle and wheel assembly further comprises:
   an upper housing cover positioned between the at least one truck and the motor in a position above the gear; and
   a lower housing cover positioned between the at least one truck and the motor in a position below the gear.

6. The motorized, wheeled personal vehicle of claim 5, further comprising an axle housing cover, wherein the lower housing cover is removably connectable to the axle housing cover.

7. The motorized, wheeled personal vehicle of claim 1, wherein the axle and wheel assembly further comprises a secondary gear positioned about an axle and operatively connected to the gear, wherein a clutch bearing is positioned between the secondary gear and the axle.

8. The motorized, wheeled personal vehicle of claim 7, wherein the clutch bearing further comprises a freewheeling clutch.

9. The motorized, wheeled personal vehicle of claim 1, wherein the axle and wheel assembly further comprises a secondary gear positioned about an axle and operatively connected to the gear, wherein a bearing is positioned between the axle and a wheel.

10. The motorized, wheeled personal vehicle of claim 9, wherein the bearing further comprises a Sprag bearing positioned at least partially within the wheel.

11. The motorized, wheeled personal vehicle of claim 1, further comprising a battery system positioned on an underside of the deck, the battery system electrically connected to the motor, wherein the battery system further comprises a regenerative battery charging system.

12. The motorized, wheeled personal vehicle of claim 1, further comprising a controller in communication with the motor, wherein the controller controls an operation of the motor.

13. The motorized, wheeled personal vehicle of claim 12, wherein the controller further comprises a remote control device adapted to be carried by a rider of the motorized, wheeled personal vehicle.

14. A motorized, single-rider skateboard vehicle comprising:
   a skateboard deck;
   two trucks affixed to the skateboard deck;
   a bushing assembly interfaced between each of the two trucks and the skateboard deck;
   an axle and wheel assembly rotatably connected to at least one of the two trucks; and
   a motor operatively connected to the axle and wheel assembly with at least one non-belt driven connection having at least one gear extending into a cavity within the truck, wherein the motor is free from a connection with the deck, wherein the cavity within the truck further comprises a fluid tight cavity, wherein a lubricating fluid is contained within the fluid tight cavity.

15. The motorized, single-rider skateboard vehicle of claim 14, further comprising a Sprag bearing positioned at least partially within a wheel of the axle and wheel assembly, wherein the gear of the motor is operatively connected to an axle of the axle and wheel assembly with a secondary gear.

16. A method of riding a motorized, single-rider skateboard vehicle, the method comprising:
   providing a motorized, single-rider skateboard vehicle having a skateboard deck, two trucks affixed to the skateboard deck, a bushing assembly interfaced between each of the two trucks and the skateboard deck, and an axle and wheel assembly rotatably connected to at least one of the two trucks, wherein the deck is adapted to carry a rider of the motorized, single-rider skateboard vehicle;
   supplying a quantity of electrical power to a motor operatively connected to the axle and wheel assembly with at least one non-belt driven connection having at least one gear extending into a cavity within the truck, wherein the motor is free from a connection with the deck, wherein the cavity within the truck further comprises a fluid tight cavity, wherein a lubricating fluid is contained within the fluid tight cavity; and
   user-controlling the motor with a remote control device adapted to be carried by the rider of the motorized, single-rider skateboard vehicle.

\* \* \* \* \*